March 12, 1940.   B. RUBEL   2,193,382
BAKERY MACHINERY
Filed Sept. 24, 1937   2 Sheets-Sheet 1
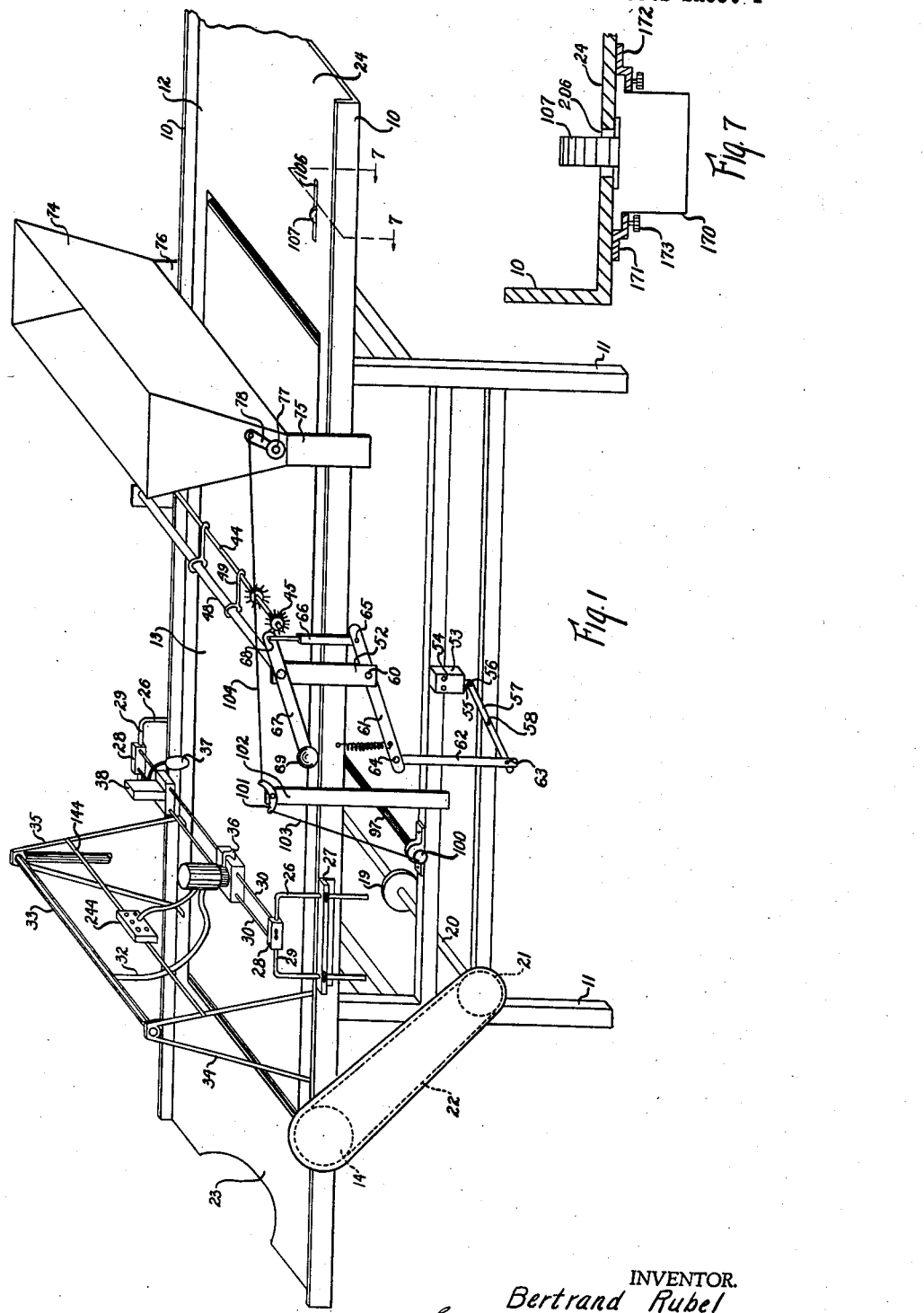
INVENTOR.
Bertrand Rubel
BY Frank Zugelter
ATTORNEY.

March 12, 1940.  B. RUBEL  2,193,382
BAKERY MACHINERY
Filed Sept. 24, 1937    2 Sheets-Sheet 2
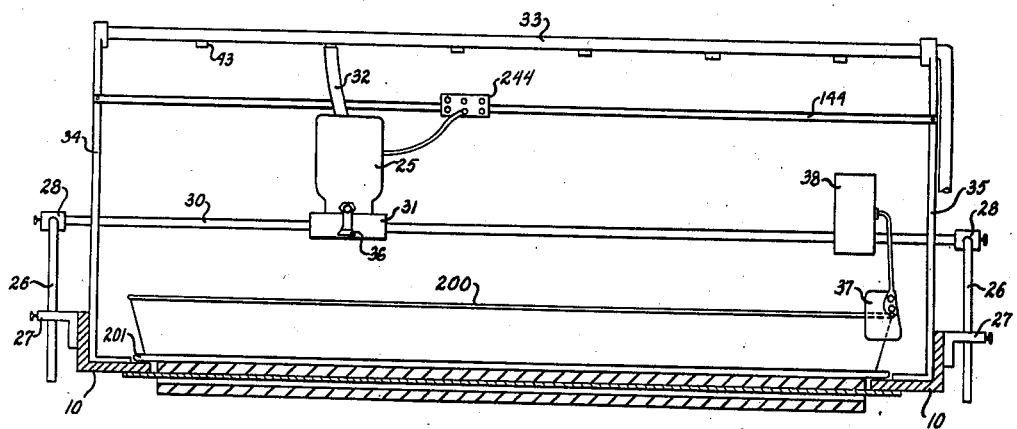
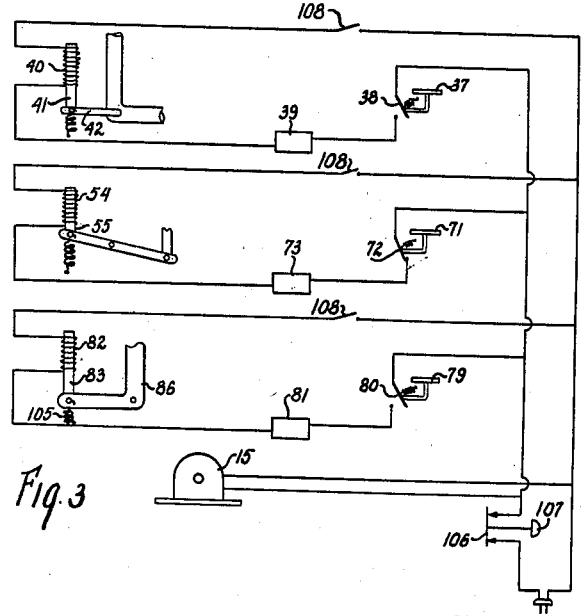
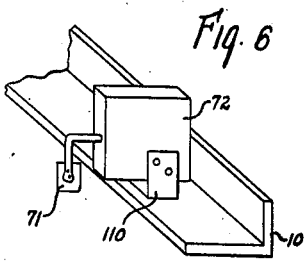
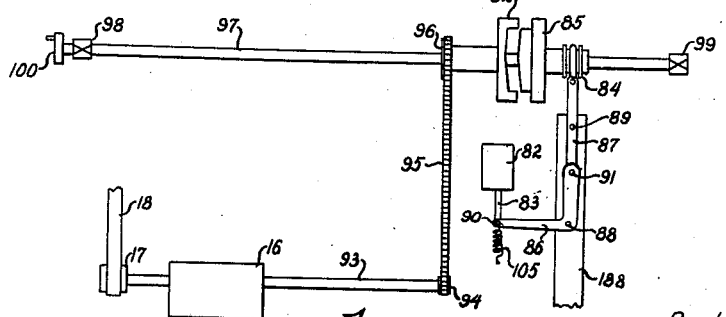
INVENTOR.
Bertrand Rubel
BY Frank Qugelter
ATTORNEY.

Patented Mar. 12, 1940

2,193,382

UNITED STATES PATENT OFFICE 2,193,382

BAKERY MACHINERY

Bertrand Rubel, Cincinnati, Ohio

Application September 24, 1937, Serial No. 165,561

8 Claims. (Cl. 107—4)

This invention relates to bakery machinery, and more especially to a means for handling bread or other bakery products subsequent to the actual dough loaf formation and prior to the baking thereof.

An object of the invention is to provide means for so handling the bakery products as they are prepared for the baking oven, as to preclude the manual handling of the pans of loaves of dough as they are treated with water, punctured for the escape of carbon dioxide gas during baking, and covered with poppy seeds.

Another object of the invention is to provide a novel arrangement of means whereby the handling and treating of the loaves is greatly simplified and expedited, thereby minimizing expense, labor and waste of time in the output of bakery goods.

The foregoing and other objects are attained by the means described herein and disclosed in the accompanying drawings, in which:

Fig. 1 is a perspective view of the machine embodying the invention.

Fig. 2 is a front end view of the moistening unit shown in Fig. 1.

Fig. 3 is a diagrammatic plan of the electrical circuits used in the invention.

Fig. 4 is a fragmentary view of the stooper unit shown in Fig. 1.

Fig. 5 is a diagrammatic view showing the mechanical relationship of the parts of poppy seed mechanism shown in Fig. 1.

Fig. 6 is a perspective view of a time limit switch mounting.

Fig. 7 is an enlarged sectional view on line 7—7 of Fig. 1.

The introduction of labor saving devices into modern bakeries has enabled bakers to mechanically mix and knead bread dough, to automatically size the loaves, to automatically convey the bread through heat chambers as it rises, and to automatically re-knead the dough and shape it into individual loaves ready to be baked. However, the process of moistening the outer skin of such breads as rye, Vienna, and poppy seed has always been done by hand. The same holds true as to the puncturing of holes through the upper skin of the bread prior to baking, and to the sprinkling of poppy seeds upon the moistened surface of the loaf. One of the primary objects of the present invention is to eliminate these various hand operations which are performed just a moment or two prior to the placing of the bread into the oven in order to prevent the skin from re-forming over the punctures which would defeat the purpose of such an operation.

It is planned that the machine comprising this invention shall be located near the baking oven in order that the dough after treatment, may be placed in the ovens without further delay. As the bread is placed in the bake pans after being re-kneaded and shaped, certain varieties of bread are then moistened to assure a glossy surface on the finished product, and to act as an adherent for poppy seeds and the like which are sprinkled on the loaf just prior to baking. Certain breads such as rye, require that holes be punched through the top skin of the bread dough prior to baking so that the carbon dioxide gas liberated during the baking process may escape. The object of the invention is to provide a machine which will automatically perform any or all of the three operations in an orderly sequence.

In practicing the invention, trays of bread dough are placed, one at a time, upon the charge end of a conveyor unit. As the pans are carried forward, the contents thereof are sprayed with a fine mist of water as they pass under the moistening unit. This operation is given most bread products regardless of variety. The conveyor then carries the pan forward under the stooper unit which is automatically lowered into operative position to punch holes through the upper skin of bread such as rye, as the dough passes under it. The pans are then carried under the sifter unit which automatically sifts poppy seeds upon the moistened, punctured loaves as they pass under it. The conveyor then deposits the bake pans containing the now conditioned loaves onto the discharge platform of the machine. In doing so the bottom of each pan makes contact with an electric switch mounted in said discharge platform thereby causing the entire machine to stop until the pan making the contact is removed by an operator who places the pan into the oven. Each unit is constructed so as to operate only during that period of time during which a bake pan is beneath it, thereby effecting a great saving of energy as well as materials such as water and poppy seeds, which results in a clean machine, free from quantities of unused and/or misdirected supplies.

Referring now to Fig. 1 of the drawings, there is provided a suitable framework 10 mounted upon suitable supports 11, and including a bed or table 12 over which conveyor belt 13 is adapted to move for advancing the pans containing the pre-baked bread dough. The conveyor is of the endless chain type being supported at either end upon suitable sprockets, one of which is indicated at 14.

As shown in Fig. 5, motive power to propel the conveyor may be supplied by an electric motor 15 suitably connected through a speed reduction box 16, pulley 17 and belting 18 to pulley 19 on shaft 20 (Fig. 1). Pulley 21 transmits power to sprocket wheel 14 by any suitable means such as belting 22. At either end of the conveyor unit a platform is located, such as charging platform 23 which enables the operator to support a bread pan until the conveyor belt has presented a receiving section; and discharge platform 24 which retains the pans until the other operator can remove them.

A very satisfactory arrangement of the various units is produced by mounting the moistening unit nearest to the charging platform 23. This unit comprises a plurality of electrically controlled water valves 25 so mounted as to direct a spray of water downward toward the conveyor belt. For brevity and simplicity but one such unit is shown in Fig. 1, but it is to be understood that any number of such units may be hooked up and mounted in the same way as the one shown. The valve units (Fig. 2) are supported above the conveyor unit on vertically adjustable support members 26 which are slidably mounted in brackets 27 which are securely fastened to the framework 10 by any suitable means, such as a weld. Horizontally adjustable members 28 are mounted upon the cross arms 29 connecting the depending legs of members 26. Support members such as suitable rods 30 are anchored between members 28 thereby providing spaced guides upon which moistening units 25 are mounted. Each moistening unit comprises a base member 31 slidably mounted upon rods 30. A commercial solenoid-operated water valve unit 25 is mounted upon base 31. The inlet water connection to the valve unit is connected by suitable hose 32 to water supply pipe 33, mounted upon suitable brackets 34 and 35 and connected to a source of supply, not shown. To the water outlet or discharge side of the valve unit, a spray nozzle head 36, as clearly shown in Fig. 2, is mounted as to direct its discharge downward towards the conveyor belt. A time limit switch 38, having a depending bread pan contacting flap 37 may be mounted upon rods 30 as shown in Figs. 1 and 2. When the side of a bake pan contacts flap 37 of time limit switch 38, circuit is instantly closed to time delay switch 39 (Fig. 3). After a predetermined length of time, the contact arms (not shown) of delay switch 39 are closed, thereby closing the circuit to solenoid 40 which causes soft iron core 41 to be drawn upward, pulling with it the water valve control arm 42. This opens the water valve permitting water to flow to the nozzle 36. After the bake pan has passed by flap 37, it swings back to its non-operative position breaking the contact in time limit switch 38, which instantly deenergizes solenoid 40 whereby the water valve is closed. The purpose of the time delay switch 39 is to allow sufficient time to elapse from the time the edge of a pan trips flap 37 of time limit switch 38 until the pan has moved forward under the spray nozzles before the water is turned on. By means of the adjustable support members 26 and 28, and because each unit may be moved laterally upon the rods, any size loaf, and any number of loaves in a pan may be accommodated. Water supply pipe 33 is furnished with a number of outlets 43 so that each unit will have its own water supply. In a like manner, outlet box 244, suitably mounted on bracket 144, permits electrical connections to be made to each unit independently, although all of the units receive their impulse from the same time delay switch 39 shown in Fig. 3.

Intermediate the moistening unit and the poppy seed unit, a stooper unit is interposed, Figs. 1 and 4. This unit comprises a stooper shaft 44 carrying stoopers 45 which are secured to the shaft by any suitable means such as by set screws 47. Shaft 44 is positioned away from main shaft 48 by means of adjustable bracket arms 49 which are securely fixed to the respective shafts by suitable set screws 50 and 51. The stoopers may be made of any suitable material having sufficient width to properly imbed a series of short sharpened spikes which protrude radially from its circumference. The main shaft 48 is supported by bracket piece 52 which extends up from the framework 10 to which it is fastened.

A solenoid 53 is suitably mounted to framework 10 by any suitable means such as bolts 54. The end of the soft iron core piece 55 is connected by pin 56 to lever arm 57 which is free to move about pivot 59 by which it is fastened to framework 10. Pivoted to the lower end of bracket 52 as at 60, is lever arm 61 which is linked to lever arm 57 by means of rod 62, through pins 63 and 64. The other end of arm 61 is connected by pin 65 to an adjustable linkage member 66 which is connected to one end of lever arm 67 through pin 68. One end of shaft 48 extends through bracket-bearing member 52 and is securely fixed to lever arm 67 which pivots about shaft 48 so that any vertical movement of the end of arm 67 will cause shaft 48 to rotate thereby raising or lowering the offset stooper shaft 44. A weight 69 is fastened to the free end of arm 67 to counterbalance the weight of the stooper shaft and associated stoopers.

When the contact flap 71 of time limit switch 72, which may be mounted on bracket 110 to framework 10 as shown in Fig. 6, is moved by the side of a passing pan, the closed electrical circuit to solenoid coil 54 (Fig. 3) is broken in time limit switch 72. However, this break in circuit is not instantly transmitted to solenoid unit because of unit 73 which may be a time relay switch. After the delay has been completed in relay unit 73, the circuit to solenoid 54 is broken and the stooper unit lowered into operative position. When the contact flap 71 is released by the pan, the circuit to solenoid 54 is instantly closed and the stooper unit lifted up to permit unobstructed passage of the next bread pan. The number of stooper units mounted upon shaft 44 may be varied to meet the varying conditions encountered in the bakery. Usually one stooper wheel is used per loaf, although several could be used if desired. By loosening the collars 46, the stooper wheels may be laterally shifted at will.

The last unit mounted above the conveyor belt is the poppy seed sifter unit which comprises a hopper 74 as shown in Fig. 1 suitably mounted above the conveyor on adjustable supports 75 and 76 and having a sifting unit incorporated in the lower part thereof, not shown. Any suitable sifting unit may be used such as the one disclosed in Patent #1,829,707 to W. G. Kirchhoff. To the end of the sifter unit shaft 77, an arm 78 is fastened by suitable means such as by a set screw, not shown. This unit is put into operation as follows: When the side of a bake pan contacts flap 79 (Fig. 3) of time limit switch 80, the circuit is closed to time delay switch 81. After a predetermined period of time, the delay switch 81 closes the circuit to solenoid 82 which causes the soft iron core 83 to be drawn upward into coil 82. As shown in Fig. 5, this motion is transmitted to collar 84 of clutch face 85 through linkage members 86 and 87 which are pivoted to a suitable support member 188 as at 88 and 89 respectively. Suitable pins such as 90 and 91 connect the iron core piece to lever arm 86 and this arm to lever 87, so that when the solenoid 82 is energized, linkage member 86 swings about pivot 88 thereby pushing the lower end of lever 87 to the right about pivot 89 whereby the collar 84 is urged to the left to bring clutch plate 85 into engagement with clutch plate 92. Clutch plate 92 is connected to drive motor 15 through speed reduction box 16, shaft 93, sprocket 94, chain 95 and sprocket 96 which is fastened to the driving face 92 of the clutch. When the clutch plates 85 and 92 are engaged, shaft 97 is caused to rotate in bearings 93 and 94 which are suitably mounted to support member 10. An eccentric 100 is fastened to the end of shaft 97 opposite from the clutch. As shown in Fig. 2, the rotary motion of eccentric 100 is translated into a reciprocating motion of sifter arm 78 by means of linkage member 101 mounted upon framework support 102 and associated connected rods 103 and 104, thereby causing the sifter unit to sift the hopper contents onto the pans of bread dough moving below. When the time limit switch flap 79 is released, the circuit to solenoid 82 is broken which permits spring 105 to disengage clutch plates 85 and 92 thereby stopping shaft 97 which in turn stops the sifter. After being treated or conditioned by the sifter unit, the bread and pans are expelled from the conveyor onto the discharge platform 24. Mounted in this platform is an electric switch 106 which is wired in series with the electric drive motor 15 and all of the solenoid circuits, Fig. 3, so that when the contact roller 107 of switch 106 is depressed by the weight of a bake pan, the aforementioned circuits are broken and the machine is brought to a stop, whereby it performs the function of a safety device by stopping the machine so that other bake pans are not expelled (which would push those already on the discharge platform onto the floor), until the bake pan resting upon the switch is removed by the operator to be placed into the oven.

Each unit may be electrically disconnected from the machine by means of switches 108 (Fig. 3) whereby the flexibility of the machine is made a maximum. This may be illustrated by assuming that a rye loaf is being run through the machine. In this case the loaf is (1) sprayed, (2) conditioned by the stoopers, and (3) sprinkled with plant seed, or if desired the plant seed unit may be disconnected, thereby eliminating that operation. When a pan is discharged by the conveyor onto platform 24, the machine is stopped until an attendant removes the loaded pan, at which time the machine automatically starts up and delivers the next pan onto the discharge platform.

It is to be understood that the relative positions of the units as described may be altered to suit the individual bakery setup; however, the one just described was found to be most satisfactory to the inventor. All the electrical devices embodied herein are of the commercial type and as described merely indicate the function to be performed, rather than limit the scope of invention to any certain hook-up or type of electrical device.

The use and operation of the apparatus will now be explained in connection with the treating or handling of rye dough. It is not to be inferred, however, from this explanation, that the device is limited either to rye dough or to other doughs in which the pans employed are provided with or without bottoms.

In operation, when preparing rye dough, it is desired that the loaves of dough shall be positioned upon the hearth of the oven. Accordingly, in preparing the loaves of dough, it is customary to place a pan 200 upon a flat board 201. The pans ordinarily do not have bottoms and consist merely of end and side walls. In some instances the pans may be considerably shorter or narrower than the boards or panels 201. Nevertheless, the operator stationed at the receiving end 23 of the conveyor positions the panels or boards 201 upon the conveyor so that succeeding panels contact one another. This serves to properly space the panels and pans and consequently the loaves of dough.

As the panels together with the pans 200 are carried by the conveyor, the walls of the pan along the end edge thereof contact the various triggers or flaps such as 37 for rendering various mechanisms operative as the pan moves beneath or along the various spraying, puncturing and sifting mechanisms. When the panels reach the discharge end of the conveyor, it is intended that an operator will remove the board together with the pan and the dough therein and that such operator will transfer the pans and loaves of dough from the panel 201 to the hearth of the oven. Such transfer is common practice and is accomplished by the operator merely introducing the panel and the pan and loaves carried thereby into an oven. Prior to introduction thereof into an oven, a long pole has been detachably connected to the panel, and then the operator by giving a deft quick jerk or pull upon the pole withdraws the panel from beneath the pan and loaves of dough, thus depositing the same upon the hearth of the oven. Consequently, a panel with its charge of pan and loaves of dough, must momentarily await the return of the operator from the oven and therefore the stop switch 106 is provided. As previously explained, the device disclosed herein is disposed close to the oven and consequently the operator at the discharge end of the device is able to transfer the treated loaves of dough to the oven at approximately the same speed at which the loaves are processed or treated by the apparatus disclosed herein.

In preparing some types of bread, the pans may be provided with screen bottoms or with bottoms that are integral with the side and end walls of the pan. Regardless of whether there are bottoms in the pan or whether rye dough or other dough is being treated, the apparatus disclosed herein functions effectively and satisfactorily and accomplishes the work of several men who are thereby relieved to perform their more specialized duties as bakers.

While the stoopers or puncturing means 45, as shown herein, are associated with mechanism for raising and lowering the stoopers, it is obvious that by loosely mounting the stoopers upon the shaft 74, and by making the spikes or prongs of the stoopers sufficiently long and of suitable material, the alternate raising and lowering of the stoopers may be obviated. In those instances where the spikes would contact any upper edges of the pan walls, the stoopers would function similarly to gears and would move without hindrance, and subsequently the spikes would contact the loaves of dough contained between the pan walls. Preferably, the stoopers are not power actuated so as to avoid a tendency toward tearing of the upper surface of the dough.

The spray or water applying means may be adjustable longitudinally of the conveyor by any suitable means. As shown herein, the supporting frame comprising the blocks or members 28 and rods 26 may be shifted longitudinally of the horizontal parts 29 of the brackets 27. The blocks may be frictionally retained in adjusted position or the common expedient of thumb screws may be resorted to for holding the parts in adjusted relation. In like manner, the contact roller 107 may be longitudinally adjustable in the slot 206. This may be accomplished by providing the housing or box 170, in which the cooperating contact parts are retained, and the box may be slidable longitudinally of the brackets 171 and 172 attached to the under face of the discharge platform 24. Customary thumb screws 173 may be used to retain the box and contact member in adjusted position, in accordance with common practice involving use of such adjustment means. By reason of the indicated adjustments, the device as a whole is adapted to handle panels and pans of various sizes.

What is claimed is:

1. In a bread conditioning device comprising in combination a framework having a charging platform at one end and a discharge platform at the other end, a conveyor unit disposed between said platforms for transferring pans of unbaked bread products between said platforms, conditioning units mounted on said framework above said conveyor, selective means whereby the conditioning units are rendered operative upon the bread products as they pass below said conditioning units, and means located in the discharge platform whereby the operation of said conditioning units and conveyor is rendered inoperative by the weight of a pan of bread products.

2. In a bread conditioning device comprising in combination a framework having a charging platform at one end and a discharge platform at the other end, a conveyor unit disposed between said platforms for transferring pans of unbaked bread products between said platforms, dough conditioning means mounted on said framework above said conveyor comprising a dough moistening unit, a stooper unit and a seed sifter unit each of which is rendered operative in orderly sequence by contact means associated with each unit, said contact means being tripped by the forward edge of the bake pans as they are propelled beneath the various conditioning units, and control means associated with the discharge platform whereby the conveyor and conditioning units are rendered inoperative as long as a bake pan unit is positioned thereon.

3. In a device of the class described the combination of a conveyor for pans containing dough loaves, means for moistening the upper surfaces of loaves of dough disposed in the pans, means responsive to movement of the pans for rendering the moistening means operative, means for puncturing the upper surfaces of the loaves of dough, means responsive to movement of the pans for rendering the puncturing means operative, means for applying edible material to the loaves of dough, means responsive to the movement of the pans for rendering said applying means operative, and means controlled by the movement of pans beyond said moistening, puncturing and applying means for rendering said moistening, puncturing and applying means inoperative.

4. In a device of the class described the combination of a conveyor for pans containing dough loaves, means for moistening the upper surfaces of loaves of dough disposed in the pans, means responsive to movement of the pans for rendering the moistening means operative, means for puncturing the upper surfaces of the loaves of dough incident to movement of the loaves by said conveyor, means for applying edible material to the loaves of dough, means responsive to the movement of the pans for rendering said applying means operative, and means controlled by the movement of pans beyond said moistening, puncturing and applying means for rendering said moistening, puncturing and applying means inoperative.

5. The combination with a dough conditioning device comprising a conveyor unit having associated therewith a charge and discharge platform, of conditioning units mounted above said conveyor comprising moistening means, puncturing means and seed sifting means, each including a control means and rendered operative thereby only at such times as when a dough pan has contacted the respective control means, and means located in the discharge platform for controlling the operation of the conveyor and conditioning units whenever a dough pan is positioned thereon.

6. In a bread conditioning device comprising in combination a framework having a charging platform at one end and a discharge platform at the other end, a conveyor unit disposed between said platforms for transferring pans of unbaked bread products from one platform to the other, independently operable conditioning means mounted on said framework above said conveyor, independent selective means positioned relative to the conveyor unit operative by contact with the pan, one such independent selective means being provided for each conditioning unit whereby the conditioning units are independently rendered operative upon the bread products as they pass below each of the conditioning units and contact control means located on the discharge platform whereby the operation of the conveyor and conditioning units are rendered inoperative during those periods of time when a bake pan unit is positioned upon said discharge platform.

7. In a device of the class described, comprising in combination a framework, a conveyor for transferring objects from one end of said framework to the other, a superstructure disposed over said conveyor unit, a plurality of dissimilar conditioning means in spaced relationship supported from said superstructure above said conveyor, of a plurality of mutually independent control units for controlling the operation of said conditioning means, one such control unit being provided for each of the dissimilar conditioning means, each of said control means being responsive to the movement of objects carried on said conveyor for rendering the particular conditioning means associated therewith operative only when articles being carried on said conveyor are aligned directly below the particular conditioning means controlled thereby and a master control means operated by one such object that has passed beyond all of the conditioning means, to influence the control units for disabling all said conditioning means simultaneously.

8. In a device of the class described, comprising in combination a framework, a conveyor for transferring a plurality of individual units disposed in rows at right angles to the direction of conveyor travel from one end of said framework to the other, a superstructure provided over said conveyor, a plurality of mutually independent, laterally shiftable moistening units including nozzles supported from said superstructure, one nozzle being provided in vertical alignment with the line of longitudinal travel of each of the units comprising a row on said conveyor, and means for simultaneously effecting a fluid discharge from each nozzle, upon the units comprising a row as said units are moved beneath said nozzles, and for preventing a discharge from said nozzles during all those times other than when a row of units is positioned beneath said nozzles.

BERTRAND RUBEL.